R. PHILLIPS.
CHAIN FASTENER.
APPLICATION FILED DEC. 6, 1918.

1,330,341.

Patented Feb. 10, 1920.

Witnesses
E. R. Ruppert

Inventor
R. Phillips
By Victor J. Evans
Attorney

UNITED STATES PATENT OFFICE.

REED PHILLIPS, OF SALEM, INDIANA.

CHAIN-FASTENER.

1,330,341.  Specification of Letters Patent.  Patented Feb. 10, 1920.

Application filed December 6, 1918. Serial No. 265,599.

*To all whom it may concern:*

Be it known that I, REED PHILLIPS, a citizen of the United States, residing at Salem, in the county of Washington and State of Indiana, have invented new and useful Improvements in Chain-Fasteners, of which the following is a specification.

The object of the invention is to provide an anti-skid chain and fastener for automobile drive wheels and similar purposes, having the advantages of being applicable quickly and effectively, with the least possible effort and inconvenience on the part of the operator, and also to provide a device for the purpose indicated which will minimize the amount of material and the number of elements in the construction so that the original cost may be reduced without affecting the durability, and also whereby worn parts may be readily replaced as required, from time to time, without affecting the general construction.

Further objects and advantages of the invention will appear in the course of the following description of a preferred embodiment thereof, it being understood however that changes in form, proportion and details may be resorted to, within the scope of the appended claim, without departing from the principles involved.

In the drawing:—

Figure 1:
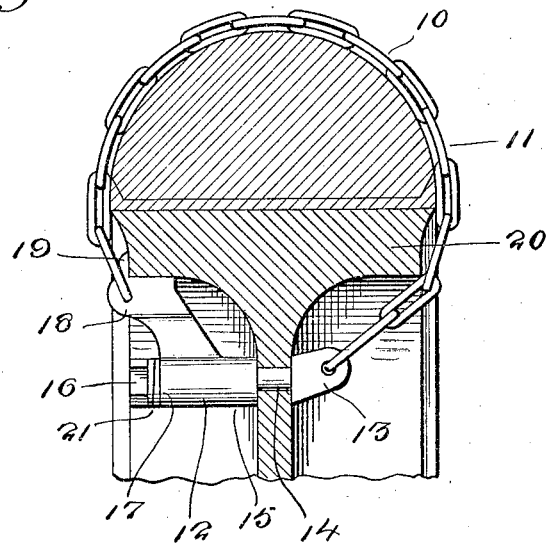
Figure 1 is a view of a member of an anti-skid device applied in the operative position to a wheel, the latter being shown in transverse section.
Figure 2:
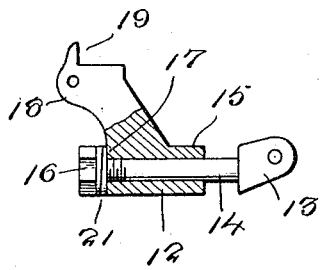
Fig. 2 is a detail view detached of the anti-skid member, the fastening means being shown in section.
Figure 3:
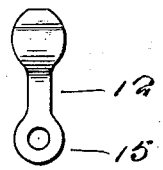
Fig. 3 is an end view of one of the elements of the fastening device.

To the terminals of a chain 10 constituting a member of the device and adapted to be arranged transversely spanning the tire which is indicated at 11 are connected the elements 12 and 13 of a fastening device, said elements having their remote extremities provided with eyes or openings for engagement with the terminal links of the chain and respectively having male and female engaging means consisting for example of a bolt extension 14 and a socket or channel 15 with the extremity of which bolt is engaged a nut 16. The outer end of the socket portion of the fastener element 12 is provided with an abrupt transverse shoulder 17 to constitute a seat for said nut, so that by tightening the latter the bolt 14 may be extended through the socket to apply the required tension to the chain 10. Extending diagonally from the tubular socket portion of the fastener element 12 is an arm 18 provided with a terminal lip 19 for engagement with the side of the wheel rim 20, so that in tightening the adjusting member or nut 16 the fixed relation of the fastener member 12 with the wheel rim is assured.

Obviously an anti-skid device of the type indicated can be applied to a tire having any of the known or approved transverse contours or diameters, whether of the pneumatic or of the solid or cushion type, and also, obviously, any desired number of tire spanning linked or chain members may be employed in connection with a wheel, depending upon the service to be performed, the diameter of the wheel and other conditions, and as there is no lost motion or looseness of the chain in its relation with the tire, the chafing or wearing due to the use of the ordinary anti-skid chain is avoided while the traction or grip of the wheel on the surface traversed is reliable.

Anti-skid devices such as described may be applied to and used more or less continuously with wheel tires without the disadvantage incident to the use of the ordinary anti-skid chains which are ordinarily used only in emergencies, and therefore the inconveniences attendant upon applying the chains when required by the conditions of the weather or the road, and involving great discomfort to the operator, especially in severely cold weather may be entirely avoided, and as will be understood, any one of the anti-skid members constructed as set forth may be replaced when worn or injured without affecting the other members and the breaking or disengagement of one member does not in any way destroy or detract from the efficiency of the remaining members connected with the same wheel. A lock washer 21 may be arranged under the nut 16 to prevent accidental loosening of the parts due to vibration and strain.

Having described the invention I claim:—

An anti-skid device for wheel tires consisting of a chain for transversely spanning the tire and a fastener having inter-locking male and female elements respectively connected with the extremities of said chain, one of said elements being provided with a diagonally disposed extension or arm terminating in a shouldered lip for engagement with the side surface of a wheel rim.

In testimony whereof I affix my signature.

REED PHILLIPS.